(12) United States Patent
Brennetot

(10) Patent No.: US 11,959,504 B2
(45) Date of Patent: Apr. 16, 2024

(54) SELF-FORMING THREAD BLIND FASTENER

(71) Applicant: HOWMET AEROSPACE INC., Pittsburgh, PA (US)

(72) Inventor: Thomas Brennetot, Conflans-Saint-Honorine (FR)

(73) Assignee: HOWMET AEROSPACE INC., Pittsburgh, PA (US)

(*) Notice: Subject to any disclaimer, the term of this patent is extended or adjusted under 35 U.S.C. 154(b) by 0 days.

(21) Appl. No.: 18/004,717

(22) PCT Filed: Jul. 16, 2021

(86) PCT No.: PCT/US2021/042013
§ 371 (c)(1),
(2) Date: Jan. 9, 2023

(87) PCT Pub. No.: WO2022/020203
PCT Pub. Date: Jan. 27, 2022

(65) Prior Publication Data
US 2023/0250842 A1    Aug. 10, 2023

Related U.S. Application Data

(60) Provisional application No. 63/056,080, filed on Jul. 24, 2020.

(51) Int. Cl.
*F16B 19/10*    (2006.01)
(52) U.S. Cl.
CPC ...... *F16B 19/1072* (2013.01); *F16B 19/1054* (2013.01)
(58) Field of Classification Search
CPC .......................... F16B 19/1072; F16B 19/1054
See application file for complete search history.

(56) References Cited

U.S. PATENT DOCUMENTS

| 2004/0033119 A1* | 2/2004 | Hufnagl ............ F16B 19/1054 411/34 |
| 2006/0062650 A1 | 3/2006 | Keener |
| 2008/0010817 A1 | 1/2008 | Cobzaru |

FOREIGN PATENT DOCUMENTS

| EP | 0372704 B1 | 2/1993 |
| JP | 9-144726 A | 6/1997 |

(Continued)

OTHER PUBLICATIONS

JP09144726A English translation and FOR (Year: 1997).*

(Continued)

*Primary Examiner* — Jason L Vaughan
*Assistant Examiner* — Amanda Kreiling
(74) *Attorney, Agent, or Firm* — K&L Gates LLP

(57) ABSTRACT

Self-forming thread blind fasteners and methods for fastening are provided. The self-forming thread blind fastener comprises a sleeve and a pin. The sleeve comprises a first sleeve end, a second sleeve end, an elongate portion, and an inner wall defining a bore. The pin is configured to be at least partially received by the bore. The pin comprises a first pin end, a second pin end, a pin head portion, an at least partially threaded portion, a shank intermediate, and a driving portion. The at least partially threaded portion is configured to form threads on at least a portion of the inner wall of the sleeve. The driving portion is configured to receive a torque to rotate the pin within the sleeve and thereby axially compress and deform the sleeve and form the threads on the at least a portion of the inner wall of the sleeve.

20 Claims, 8 Drawing Sheets

(56) References Cited

FOREIGN PATENT DOCUMENTS

| | | |
|---|---|---|
| JP | 2007-64412 A | 3/2007 |
| JP | 2007-170645 A | 7/2007 |
| JP | 2020-20367 A | 2/2020 |

OTHER PUBLICATIONS

International Search Report and Written Opinion of the International Searching Authority for International Application No. PCT/US2021/042013 dated Oct. 29, 2021.

* cited by examiner

SELF-FORMING THREAD BLIND FASTENER

CROSS-REFERENCE TO RELATED APPLICATION

This application claims the benefit of U.S. Provisional Patent Application Ser. No. 63/056,080, filed Jul. 24, 2020, the entire contents of which are hereby incorporated herein by reference.

FIELD OF USE

The present disclosure relates to blind fasteners and methods for fastening using a blind fastener.

BACKGROUND

Further automating aerospace component manufacturing may reduce assembly costs and better ensure increasing rates of component production. Automation can be particularly useful in producing structural panel assemblies for aerospace applications. Blind fasteners may be used in automated production of aerospace structural panels and, therefore, there is a need for improved high-strength blind fasteners. Current commercially available high-strength blind fasteners are aimed at providing the performance characteristics of typical two-piece titanium fasteners, which may be costly. It would be advantageous to provide a blind fastener with performance characteristics that can approximate typical two-piece titanium fasteners, but which may be less costly to produce and might therefore be used as a replacement for aluminum solid rivets or aluminum lockbolts.

SUMMARY

One aspect according to the present disclosure is directed to a self-forming thread blind fastener comprising a sleeve and a pin is provided. The sleeve comprises a first sleeve end, a second sleeve end, an elongate portion extending from the first sleeve end to the second sleeve end, and an inner wall extending longitudinally through the sleeve from the first sleeve end to the second sleeve end, wherein the inner wall defines a bore. The pin is configured to be at least partially received by the bore in the sleeve. The pin comprises a first pin end, a second pin end, a pin head portion adjacent to the second pin end. The pin further comprises an at least partially threaded portion, a shank intermediate the pin head portion and the at least partially threaded region, and a driving portion adjacent to the first pin end. The pin head portion is configured to inhibit the pin head portion from passing into the bore. The at least partially threaded portion is configured to form threads on at least a portion of the inner wall of the sleeve. The driving portion is configured to receive a torque to rotate the pin within the sleeve and thereby axially compress and deform the elongate portion of the sleeve and form the threads on the at least a portion of the inner wall of the sleeve.

Another aspect according to the present disclosure is directed to a method for fastening. The method comprises inserting a second sleeve end of a sleeve of a self-forming thread blind fastener into a bore in a structure. The blind fastener comprises the sleeve and a pin. The sleeve comprises a first sleeve end, the second sleeve end, an elongate portion extending from the first sleeve end to the second sleeve end, and an inner wall extending longitudinally through the sleeve from the first sleeve end to the second sleeve end, wherein the inner wall defines a bore. The pin is configured to be at least partially received by the bore in the sleeve. The pin comprises a first pin end, a second pin end, and a pin head portion adjacent to the second pin end. The pin further comprises an at least partially threaded portion, a shank intermediate the pin head portion and the at least partially threaded region, and a driving portion adjacent to the first pin end. The pin head portion is configured to inhibit the pin head portion from passing into the bore. The method comprises forcibly contacting the at least partially threaded portion of the shank of the pin with the inner wall of the sleeve, thereby deforming the inner wall and forming threads thereon. The method also comprises deforming the elongate portion of the sleeve to form a bulb thereon.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain non-limiting embodiments, in one form, and such exemplifications are not to be construed as limiting the scope of the appended claims in any manner.

DETAILED DESCRIPTION OF NON-LIMITING EMBODIMENTS

Figure 1:
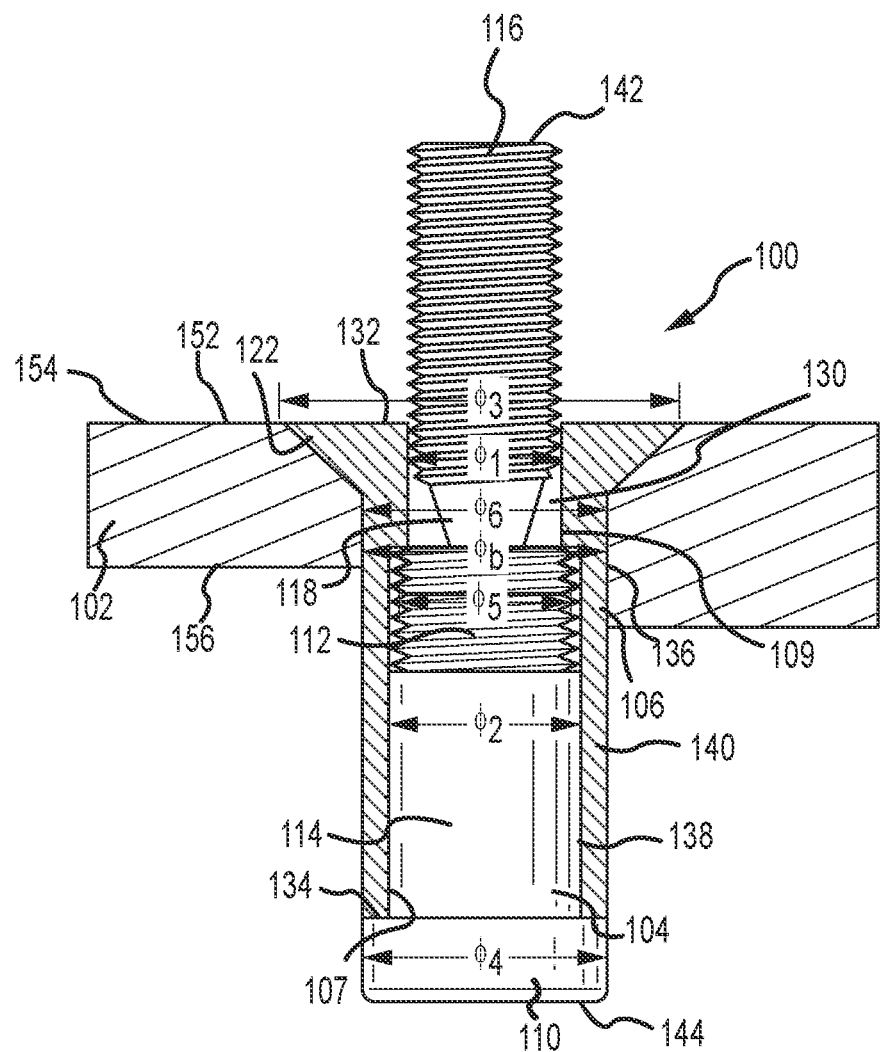
FIG. 1 is a schematic illustration showing a non-limiting embodiment of a self-forming thread blind fastener according to the present disclosure disposed in a structure (shown sectioned to expose the blind fastener) and in a first configuration.

Various examples are described and illustrated herein to provide an overall understanding of the structure, function, and use of the disclosed blind fasteners and methods. The various examples described and illustrated herein are non-limiting and non-exhaustive. Thus, the invention is not limited by the description of the various non-limiting and non-exhaustive examples disclosed herein. The features and characteristics illustrated and/or described in connection with various examples may be combined with the features and characteristics of other examples. Such modifications and variations are intended to be included within the scope of the present disclosure. The various non-limiting embodiments disclosed and described in the present disclosure can comprise, consist of, or consist essentially of the features and characteristics as variously described herein.

Any references herein to "various embodiments", "some embodiments", "one embodiment," "an embodiment", "a non-limiting embodiment", or like phrases mean that a particular feature, structure, or characteristic described in connection with the example is included in at least one embodiment. Thus, appearances of the phrases "in various embodiments", "in some embodiments", "in one embodiment", "in an embodiment", "in a non-limiting embodiment", or like phrases in the specification do not necessarily refer to the same non-limiting embodiment. Furthermore, the particular described features, structures, or characteristics may be combined in any suitable manner in one or more non-limiting embodiments. Thus, the particular features, structures, or characteristics illustrated or described in connection with one non-limiting embodiment may be combined, in whole or in part, with the features, structures, or characteristics of one or more other non-limiting embodiments without limitation. Such modifications and variations are intended to be included within the scope of the present non-limiting embodiments.

In the present disclosure, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

The grammatical articles "a," "an," and "the", as used herein, are intended to include "at least one" or "one or more", unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

There have been attempts to provide blind fastening alternatives to solid rivets. Examples include the NAS1919/1921 blind rivet. NAS1919/1921 blind rivets are installed by pulling to form a back side bulb and by locking with a small ring swaged between an outer sleeve and an inner pin. NAS1919/1921 blind rivets are quick to install, but the pulling operation until breakneck failure may be followed by a strong tension relaxation leading to a very low clamping load. This low clamping load, along with the relatively low stiffness of the fastener, may limit the ability of NAS1919/1921 blind rivets to carry general structural loads.

The self-forming thread blind fastener according to the present disclosure can provide a cost effective alternative to current fasteners with high preload and stiffness, and can be used with, for example, typical structural panels. Aspects of a non-limiting embodiment of a self-forming thread blind fastener according to the present disclosure may be understood by consideration of FIGS. 1-4. FIG. 1 schematically illustrates a self-forming thread blind fastener 100 disposed in a structure 102 (shown cut away to expose the fastener) and in a first (e.g., initial) configuration. The blind fastener 100 includes a pin 104 and a sleeve 106.

The sleeve 106 includes a first sleeve end 132, a second sleeve end 134, an elongate portion 140, and an inner wall 107 extending longitudinally through the sleeve 106 from the first sleeve end 132 to the second sleeve end 134. The inner wall 107 defines a sleeve bore 130, which can pass completely through the sleeve 106 from the first sleeve end 132 to the second sleeve end 134.

Figure 3:
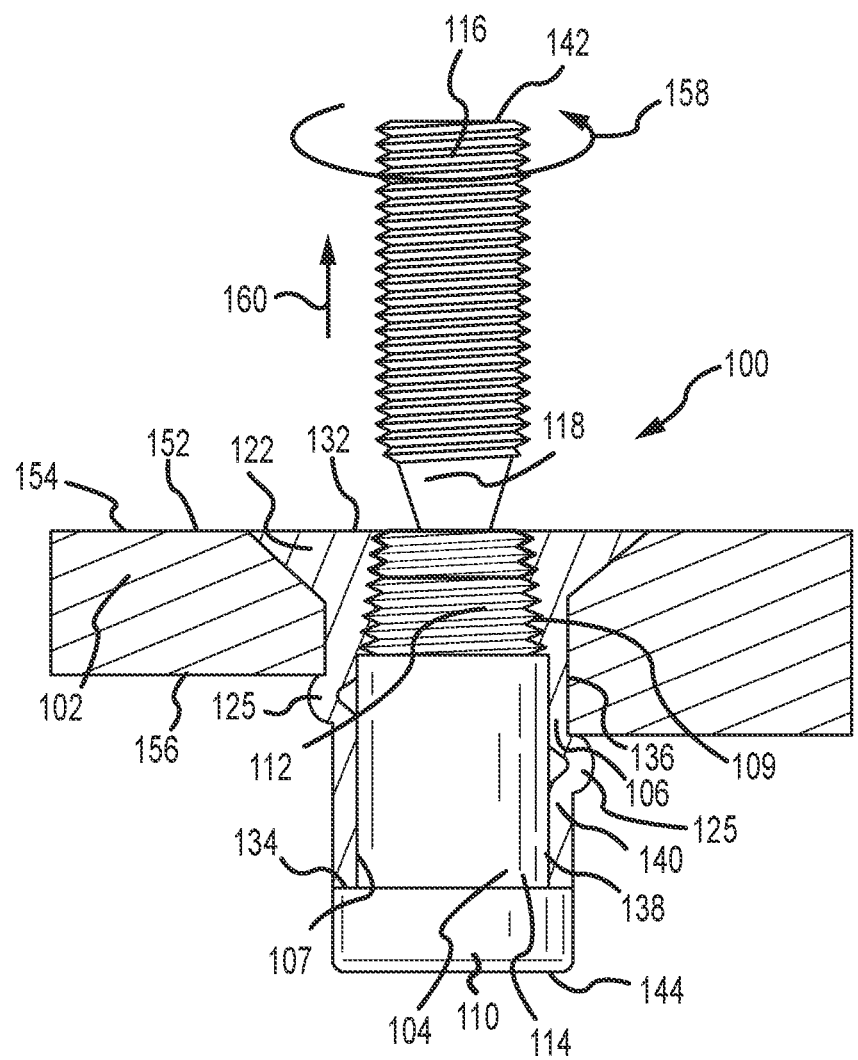
FIG. 3 is schematic illustration showing the self-forming thread blind fastener of FIG. 1 disposed in the structure and in a third configuration.
Figure 4:
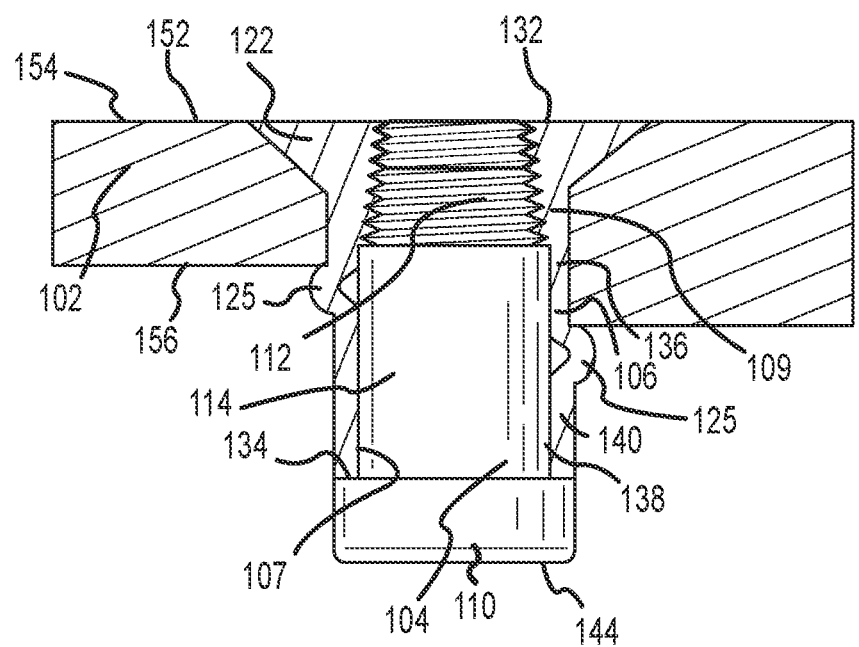
FIG. 4 is schematic illustration showing the self-forming thread blind fastener of FIG. 1 disposed in the structure and in a fourth configuration.

The elongate portion 140 can be configured to be deformed into a bulb shape, as shown in, for example, FIGS. 3-4, responsive to application of a compressive force to the elongate portion 140. For example, the elongate portion 140 can comprise a wall thickness and/or a material composition suitable to deform responsive to a compressive force. In various non-limiting embodiments, the elongate portion 140 of the sleeve 106 can be generally tubular in shape.

The inner wall 107 can comprise a variable diameter along its length. For example, a diameter of the inner wall 107 can decreases along a length of the sleeve 106 in a direction towards the first sleeve end 132. In various non-limiting embodiments, the inner wall 107 comprises a narrowed region 109 and a second region 138. The narrowed region 109 can comprise a first diameter, $\phi_1$, and the second region 138 can comprise a second diameter, $\phi_2$. The first diameter, $\phi_1$, can be less than the second diameter, $\phi_2$.

The narrowed region 109 and the second region 138 of the inner wall 107 can be substantially tubular and smooth. That is, the narrowed region 109 and the second region 138 may be free of threads (e.g., no threads are formed on the inner wall 107 during manufacture of the sleeve 106, prior to engagement with the pin 104 during installation of the blind fastener 100). In certain non-limiting embodiments, the narrowed region 109 can comprise an at least partially threaded region (not shown), to facilitate alignment and/or engagement with a threaded portion 112 of the pin 104, and a substantially smooth region (e.g., a region without threads but may contain a micro texture from a manufacturing process) that can be deformed and threaded by the threaded portion 112 of the pin 104.

Figure 8:
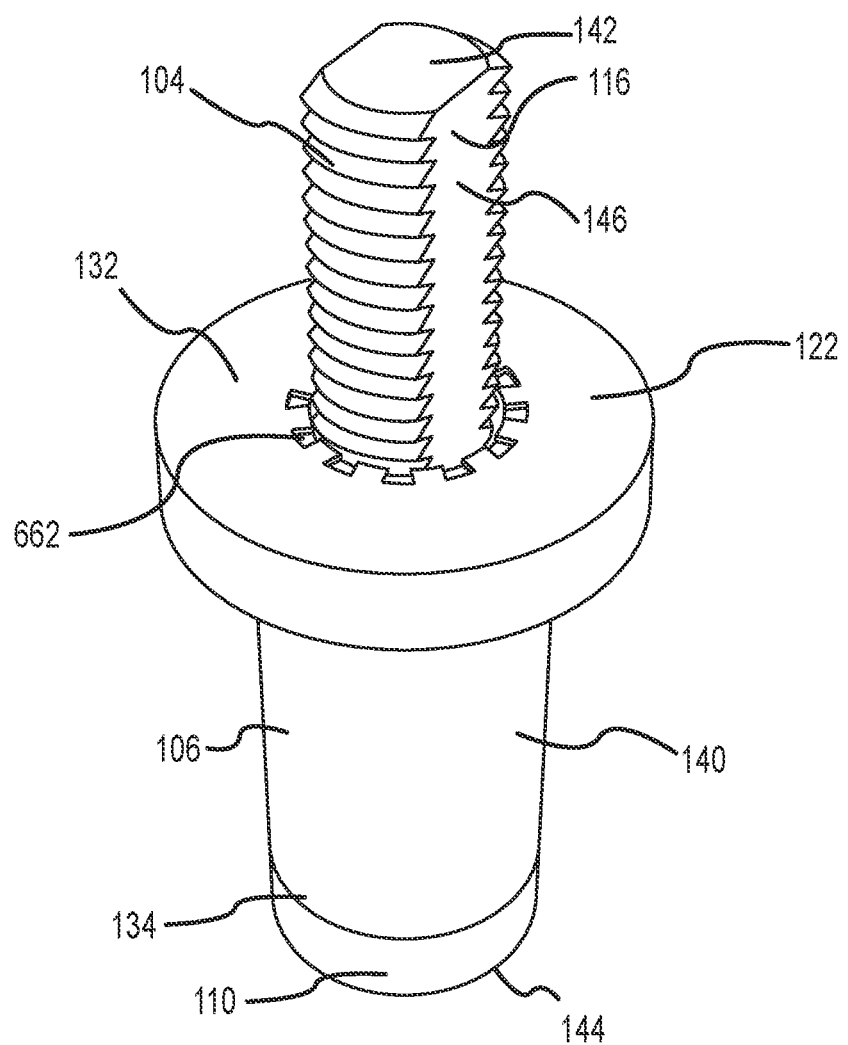
FIG. 8 is a schematic illustration showing a non-limiting embodiment of a self-forming thread blind fastener according to the present disclosure having a protruding sleeve head portion.

Again referring to FIG. 1, the sleeve 106 includes the elongate portion 140 and a sleeve head portion 122. The elongate portion 140 can comprise a shape suitable to be received in the bore 136 in the structure 102. The sleeve head portion 122 can be adjacent to the first sleeve end 132 and can be configured to inhibit the sleeve from passing into the bore 136 in the structure 102 beyond a predetermined distance. For example, the sleeve head portion 122 can comprise a third diameter, $\phi_3$, larger than a bore diameter, $\phi_b$, of the bore 136 in the structure 102. The sleeve head portion 122 can be configured to be installed substantially flush with the structure 102 as illustrated in FIG. 1 or the sleeve head portion 122 can protrude from the structure as illustrated in FIG. 8 depending on the desired application.

In various non-limiting embodiments, the sleeve head portion 122 may include one or more anti-rotation features that prevent the sleeve 106 from rotating when disposed in the bore 136 in the structure 102. The one or more anti-rotation features of the sleeve head portion 122 can comprise, for example, a flat side (e.g., the sleeve head portion 122 may have a hexagonal shape), a rib, a spline, an indent, a knurl, a lobe, a bore, a recessed socket, a tab, or a combination of two or more of those features. For example, referring to FIGS. 6 and 8, the sleeve head portion 122 can comprise recesses 662 configured to engage a corresponding feature on an installation tool or a locking component to prevent the sleeve 106 from rotating when disposed in the bore 136.

Alternatively, or in addition, the bore 136 in the structure 102 may be configured to prevent rotation of the sleeve 106 when the sleeve 106 is disposed in bore 136 of the structure. For example, the bore 136 may include one or more anti-rotation features that prevent the sleeve 106 from rotating when disposed in the bore 136 in the structure 102. The one or more anti-rotation features of the bore 136 can comprise, for example, a flat side (e.g., the bore 136 may have a hexagonal shape), a rib, a spline, an indent, a knurl, a lobe, a bore, a recessed socket, a tab, or a combination of two or more of those features. For example, the sleeve 106 may be keyed relative to the bore 136.

Referring again to FIG. 1, the pin 104 can be at least partially received by a bore 130 of the sleeve 106, and the pin 104 can include several regions or portions. For example, the pin 104 comprises a first pin end 142, a second pin end 144, a pin head portion 110 adjacent to the second pin end 144. The pin 104 further comprises the at least partially threaded portion 112, a shank 114 that is intermediate the pin head portion 110 and the threaded portion 112, and a driving portion 116 adjacent to the first pin end 142. The threaded portion 112 can be intermediate the shank 114 and the driving portion 116. The pin head portion 110 can be configured to inhibit the pin 104 from passing into the bore 130 of the sleeve 106 beyond a predetermined distance. For example, the pin head portion 110 can comprise a fourth diameter, $\phi_4$, larger than the second diameter, $\phi_2$, of the bore 130 of the sleeve 106.

The pin head portion 110 can be disposed outside of the bore 130 of the sleeve 106 such that it abuts the second sleeve end 134 and cannot enter the bore 130 of the sleeve 106. The second region 138 of the inner wall 107 can be configured to receive the threaded portion 112. For example, the threaded portion 112 can be disposed within a portion of the bore 130 of the sleeve 106 formed by the second region 138 of the inner wall 107 and can abut the narrowed region 109. At least a portion of the driving portion 116 can be positioned within a portion of the bore 130 of the sleeve 106 formed by the narrowed region 109 of the inner wall 107. In various non-limiting embodiments, as shown in FIG. 1, the driving portion 116 can extend out of the bore 130 of the sleeve 106 beyond the first sleeve end 132 such that the driving portion 116 can be engaged by an installation tool.

The driving portion 116 is configured to receive a torque to rotate the pin 104 within the sleeve 106. Thereby, the pin 104 can be moved axially to compress and deform the sleeve 106. For example, in various non-limiting embodiments, the driving portion 116 can comprise features selected from a flat side, a rib, a spline, an indent, a knurl, a lobe, a bore, a recessed socket, a tab, threads, or a combination of two or more of those features. For example, as further shown in FIG. 1, in certain non-limiting embodiments, the driving portion 116 of the pin 104 may comprise threads. In certain non-limiting embodiments, referring to FIG. 6, the driving portion 116 of the pin 104 may comprise a flat side 146.

In various non-limiting embodiments, the driving portion 116 may also comprise a breakneck portion 118 that, for example, can be adjacent to the threaded portion 112. The breakneck portion 118 is a section configured to fracture to separate all or a portion of the driving portion 116 from the remainder of the pin 104 upon installation of the blind fastener 100 in the structure 102. For example, after a torque has been applied to rotate the pin 104 and the sleeve 106 has been compressed and deformed, the breakneck portion 118 can fracture. The torque can correspond to the torque required to impart a suitable installation force on the blind fastener 100. In certain other non-limiting embodiments, the pin 104, including the driving portion 116, does not comprise a breakneck portion but, instead, is configured to include one or more other features so that the driving portion 116 of the pin 104 fractures during installation of the blind fastener 100. In various non-limiting embodiments, the breakneck portion 118 comprises a conical shape. In various non-limiting embodiments, the pin 104, including the driving portion 116, does not comprise a breakneck portion or other feature configured to fracture upon installation of the blind fastener 100, and the driving portion 116 remains intact after installation. Thus, according to various non-limiting embodiments, blind fasteners according to the present disclosure may be installed in a structure without fracturing of a breakneck portion or other feature, or may include a breakneck portion or other feature that fractures upon installation of the fastener in the structure. In certain non-limiting embodiments, the driving portion 116 is straight (not shown) and does not comprise a breakneck portion.

The threaded portion 112 is configured to form threads on at least a portion of the inner wall 107 of the sleeve 106. For example, the threaded portion 112 can form threads on at least a portion of the narrowed region 109 of the inner wall 107. The threaded portion 112 of the pin 104 includes suitable threads formed thereon and may have a generally conical, rounded, or straight shape configured to form the threads on the inner wall 107. The threads of the threaded portion 112 can be a right-handed thread or a left-handed thread. The threads of the threaded portion 112 can be, for example, square threads, trapezoidal threads, buttress threads, another thread type, or a combination of thread types. In various non-limiting embodiments, the threads of the threaded portion 112 can be thread-forming threads, such as, for example, threads of TAPTITE® fasteners (available from REMINC, Middletown, RI), or other thread forming thread types. The thread forming threads can engage and deform the inner wall 107 of the sleeve 106 to form corresponding threads on the inner wall 107. The threads of the threaded portion 112 can receive a suitable forming torque with respect to a thread stripping torque to form the corresponding threads on the inner wall 107.

In various non-limiting embodiments, the second diameter, $\phi_2$, is greater than a major diameter, $\phi_5$, of the threaded portion 112, and the first diameter, $\phi_1$, can be less than the major diameter, $\phi_5$. In this way, the threaded portion 112 can readily pass through the second sleeve end 134, facilitating assembly of the blind fastener 100, while the threaded portion 112 can forcibly engage the narrowed region 109 to install the blind fastener 100. In various non-limiting embodiments, the major diameter, $\phi_5$, of the threads 126 can be in a range of 0.06 inch to 4 inches. As used herein, "major diameter" refers to a diameter of an imaginary co-axial cylinder that just contacts the thread crest of threads on the threaded portion 112.

Figure 5:
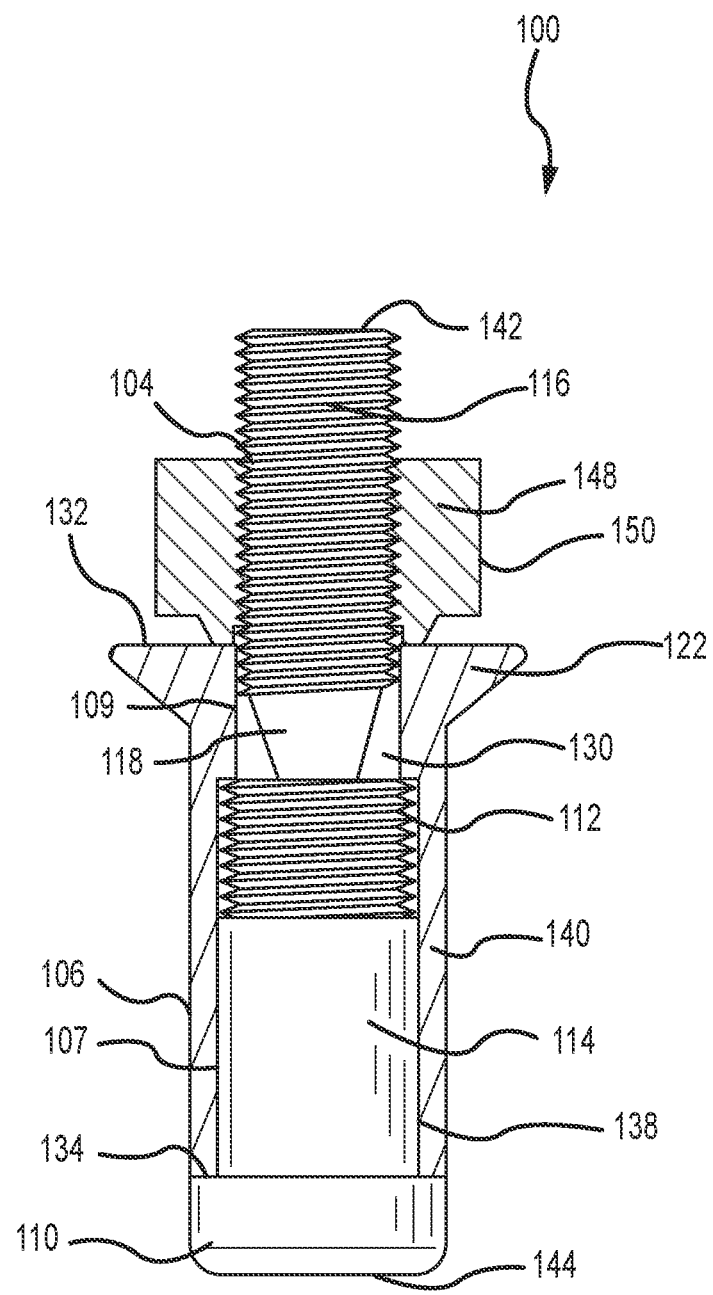
FIG. 5 is a schematic illustration showing a non-limiting embodiment of a self-forming thread blind fastener according to the present disclosure with a locking component.
Figure 6:
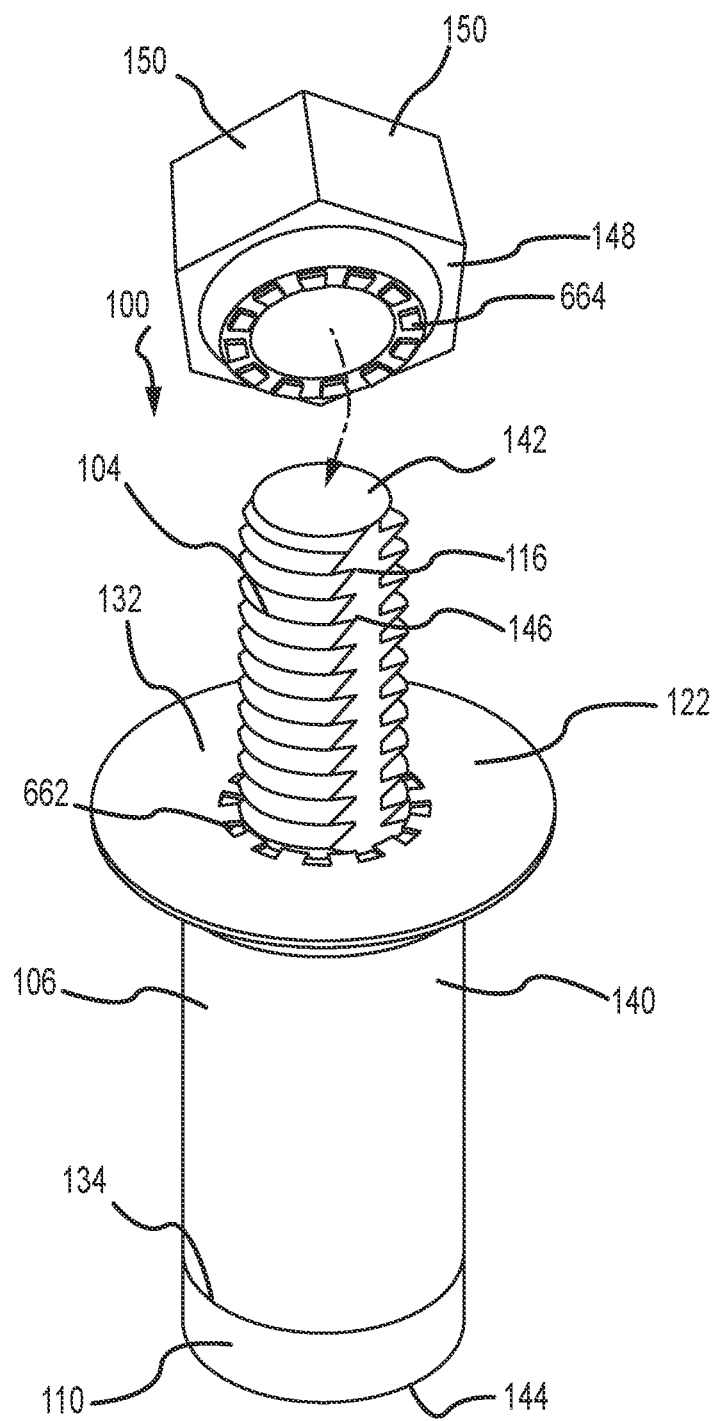
FIG. 6 is a schematic illustration showing a non-limiting embodiment of a self-forming thread blind fastener according to the present disclosure having a driving portion with a flat side.

Referring to FIGS. 5 and 6, the blind fastener 100 may comprise an optional locking component 148 attached to the sleeve head portion 122, the driving portion 116, or a combination thereof. The locking component 148 can be attached by various methods, such as, for example, by an adhesive and/or by a mechanical attachment arrangement. In one non-limiting embodiment, the locking component 148 can be integrally formed with the sleeve head portion 122, the driving portion 116, or a combination thereof. The locking component 148 is configured to inhibit the sleeve head portion 122, and thereby the sleeve 106, from rotating during installation of the blind fastener 100. For example, the locking component 148 can be engaged by an installation tool and inhibited from rotating relative to the structure 102 during rotation of the driving portion 116. In various non-limiting embodiments, the locking component 148 can comprise internal threads corresponding to the threads of the driving portion 116, and the locking component 148 can be tightened against the sleeve head portion 122. After tightening the locking component 148 against the sleeve head portion 122, the driving portion 116 can be rotated to install the blind fastener 100 while also inhibiting the locking component 148 from rotating. In various non-limiting embodiments, the locking component 148 comprises at least one feature selected from a substantially flat side, a rib, a spline, an indent, a knurl, a lobe, a bore, a recessed socket, and a tab. For example, as illustrated in FIGS. 5 and 6, the locking component 148 comprises flat sides 150.

The locking component 148 can comprise anti-rotation features 664 that are configured to correspond to anti-rotation features 662 such that the sleeve 106 can be prevented from rotating by preventing the locking component 148 from rotating. For example, as illustrated in FIG. 6, the anti-rotation features 664 are protrusions.

Blind fastener 100 can comprise at least one of a metal, a metal alloy, a composite material, or another suitable material. For example, in various non-limiting embodiments, the various components of the blind fastener 100 can comprise at least one of aluminum, an aluminum alloy, copper, a copper alloy, titanium, a titanium alloy, nickel, a nickel alloy, iron, an iron alloy, a carbon fiber composite material, or another composite material having suitable mechanical properties. The pin 104 can comprise a first material with a first hardness, and the sleeve 106 can comprise a second material with a second hardness. In various non-limiting embodiments, the second hardness can be less than the first hardness such that the threaded portion 112 can deform the inner wall 107 of the sleeve 106 with minimal, if any, deformation of the threaded portion 112. For example, in various non-limiting embodiments, the sleeve 106 can comprise aluminum, an aluminum alloy, copper, a copper alloy, brass, or bronze, and the pin 104 can comprise titanium, a titanium alloy, nickel, a nickel alloy, iron, or an iron alloy (e.g., steel, stainless steel). Producing the sleeve 106 of aluminum, for example, has the advantage that it may provide equivalent electrical bonding properties and galvanic corrosion compatibility when installed in a structure made from aluminum. In certain non-limiting embodiments, the sleeve 106 can comprise an aluminum alloy and the pin 104 can comprise a corrosion resistant stainless steel (CRES), steel, or a titanium alloy. In certain non-limiting embodiments, the threaded portion 112 can form threads on the inner wall 107 of the sleeve 106 simultaneously with the installation of the blind fastener 100 in the structure 102, thereby creating residual compressive stresses that effectively seal the pin 104 and the sleeve 106 together.

To install the blind fastener 100 in the structure 102, the blind fastener 100 is first disposed in the bore 136 in the structure 102, as generally shown in FIG. 1, with the sleeve head portion 122 of the sleeve 106 contacting a surface 152 of the structure 102 and with the driving portion 116 of the pin 104 accessible by, for example, an installation tool. As illustrated, the bore 136 can extend through the structure 102 from a first side 154 (e.g., an accessible side) to a second side 156 (e.g., a blind side).

In various non-limiting embodiments, the structure 102 can comprise, for example, at least one of a metal, a metal alloy, a composite material, or another suitable material. For example, in certain non-limiting embodiments, the structure 102 can comprise one or more of aluminum, an aluminum alloy, titanium, a titanium alloy, nickel, a nickel alloy, iron, an iron alloy, and a carbon fiber composite material. In various non-limiting embodiments, the structure 102 in which the blind fastener 100 is installed comprises aluminum and/or an aluminum alloy, such as, for example, 7075 aluminum alloy. In various non-limiting embodiments, the structure into which a fastener according to the present disclosure can be installed can be configured as an aerospace component or structure, an automotive component or structure, a transportation component or structure, a building and construction component or structure, or another component or structure. In certain non-limiting embodiments, the structure 102 can comprise a single layer of material or two or more layers of material, which may be the same material or different materials.

The blind fastener 100 can be sized as the application requires. For example, the blind fastener 100 can comprise a size in a range of ANSI screw size 4 to a 1-inch diameter. The blind fastener 100 can be configured to be installed in structures of various thicknesses. For example, the total length of the sleeve 106 can be sized such that the second sleeve end 134 extends beyond the blind side of the structure 102 when installed in the bore 136 in the structure 102. The pin 104 similarly can be sized based on the size of the sleeve 106.

Figure 2:
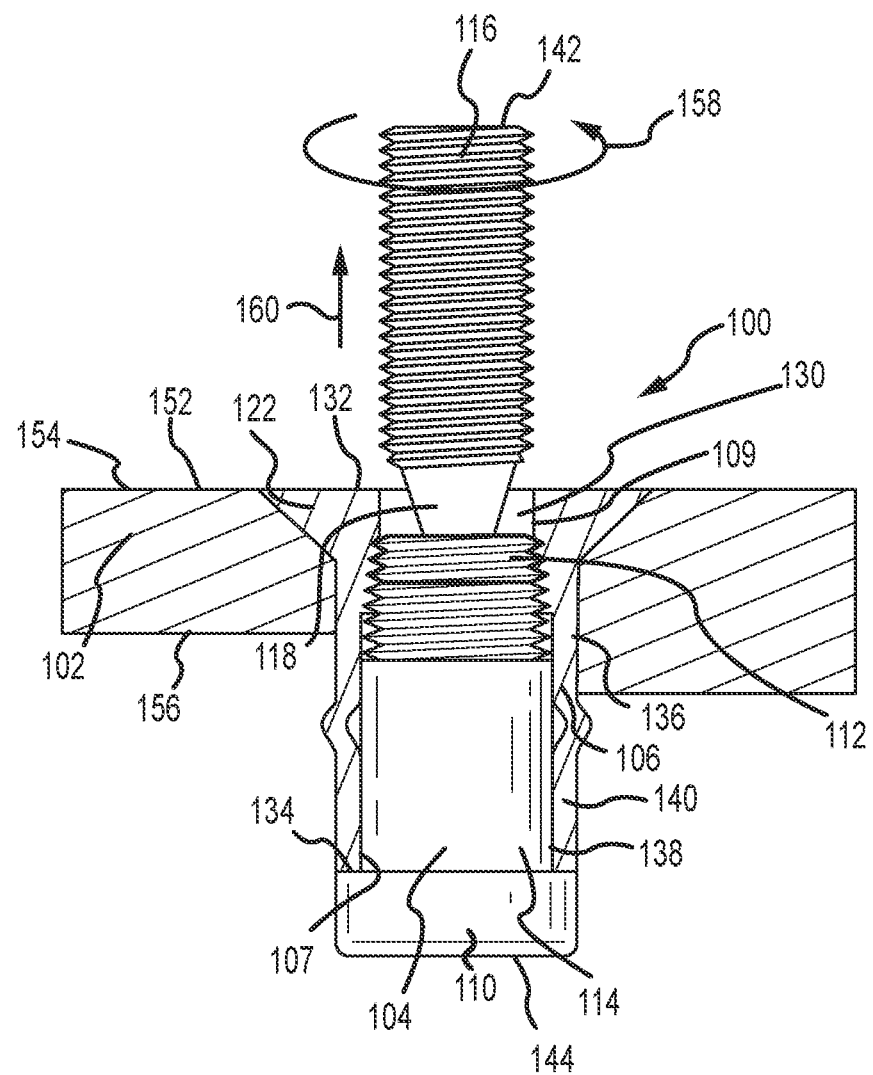
FIG. 2 is schematic illustration showing the self-forming thread blind fastener of FIG. 1 disposed in the structure and in a second configuration.

In the configuration shown in FIG. 2, the driving portion 116 of the pin 104 has been rotated in direction 158 and simultaneously urged in a direction 160 as compared to FIG. 1, thereby imparting rotary movement and a tensile force on the remainder of the pin 104. Further referring to FIG. 2, anti-rotation features on the sleeve head portion 122 of the sleeve 106 and/or comprising the configuration of the bore 136 in the structure 102 have inhibited the sleeve 106 from rotating as the pin 104 was rotated. The rotary motion and tensile force imparted on the pin 104 have caused the threaded portion 112 of the pin 104 to threadedly engage the narrowed region 109 of the inner wall 107 of the sleeve 106. As the threads of the threaded portion 112 of the pin 104 engaged the narrowed region 109, threads were formed into the narrowed region 109 of the inner wall 107. Responsive to formation of the threads, an outer diameter, $\phi_6$, of the sleeve 106 in the vicinity of the narrowed region 109 may expand, which can produce a "hole filling" effect that can be advantageous for shear fatigue load transfer in the formed joint as well as airtightness of the blind fastener 100 relative to the structure 102. In various non-limiting embodiments, the outer diameter, $\phi_6$, of the sleeve 106 in the vicinity of the narrowed region 109 is less than or equal to the bore diameter, $\phi_b$, of the bore 136 prior to installation of the blind fastener 100.

In certain non-limiting embodiments, because the threads in the inner wall 107 of the sleeve 106 are formed by the threads on the threaded portion 112, the frictional forces between the threaded portion 112 and the inner wall 107 can be high such that the blind fastener 100 can be installed to a desired clamping force and can be resistant to loosening under vibration conditions. In various non-limiting embodiments, a substantially airtight seal can be formed between the pin 104 and the sleeve 106.

As shown in the configuration illustrated in FIG. 3, further rotation of the pin 104 in direction 158 as compared to FIG. 2 has caused the threaded portion 112 to further threadedly engage the inner wall 107 and progress further along the sleeve 106 towards the first sleeve end 132, thereby forcibly contacting the second sleeve end 134 and compressing the elongate portion 140 of the sleeve 106 with the pin head portion 110 of the pin 104. As the pin 104 was rotated and the threaded portion 112 further threadedly advanced within the sleeve 106, the outer diameter, $\phi_6$, of the sleeve 106 in the vicinity of the threaded portion 112 has expanded. The elongate portion 140 of the sleeve 106 was deformed by the force exerted by the pin head portion 110, and the elongate portion 140 was axially compressed toward the sleeve head portion 122. The axial compression progressively formed a bulb 125 in the elongate portion 140, which abuts the structure 102, securing the blind fastener 100 to the structure 102.

As shown in the configuration illustrated in FIG. 4, once the blind fastener 100 was completely installed (i.e., when the torque reached a particular value), the breakneck portion 118 of the driving portion 116 broke in torsion, leaving a smooth and substantially flush surface. The axial compressive force further deformed the sleeve 106, thereby securing the structure 102 between the sleeve head portion 122 and the bulb 125.

A length of the engagement between the inner wall 107 and the threaded portion 112 after installation of the blind fastener 100 can be sized to reduce weight of the blind fastener 100 while achieving desired airtightness and desired mechanical strength of the installed blind fastener 100. The length of engagement can be configured by sizing the narrowed region 109, the total length of the sleeve 106, the length of the threaded portion 112, and the total length of the pin 104. Certain engagement lengths may be desirable if, for example, two or more bulbs are formed on the sleeve 106 during installation of the blind fastener 100.

Figure 7:
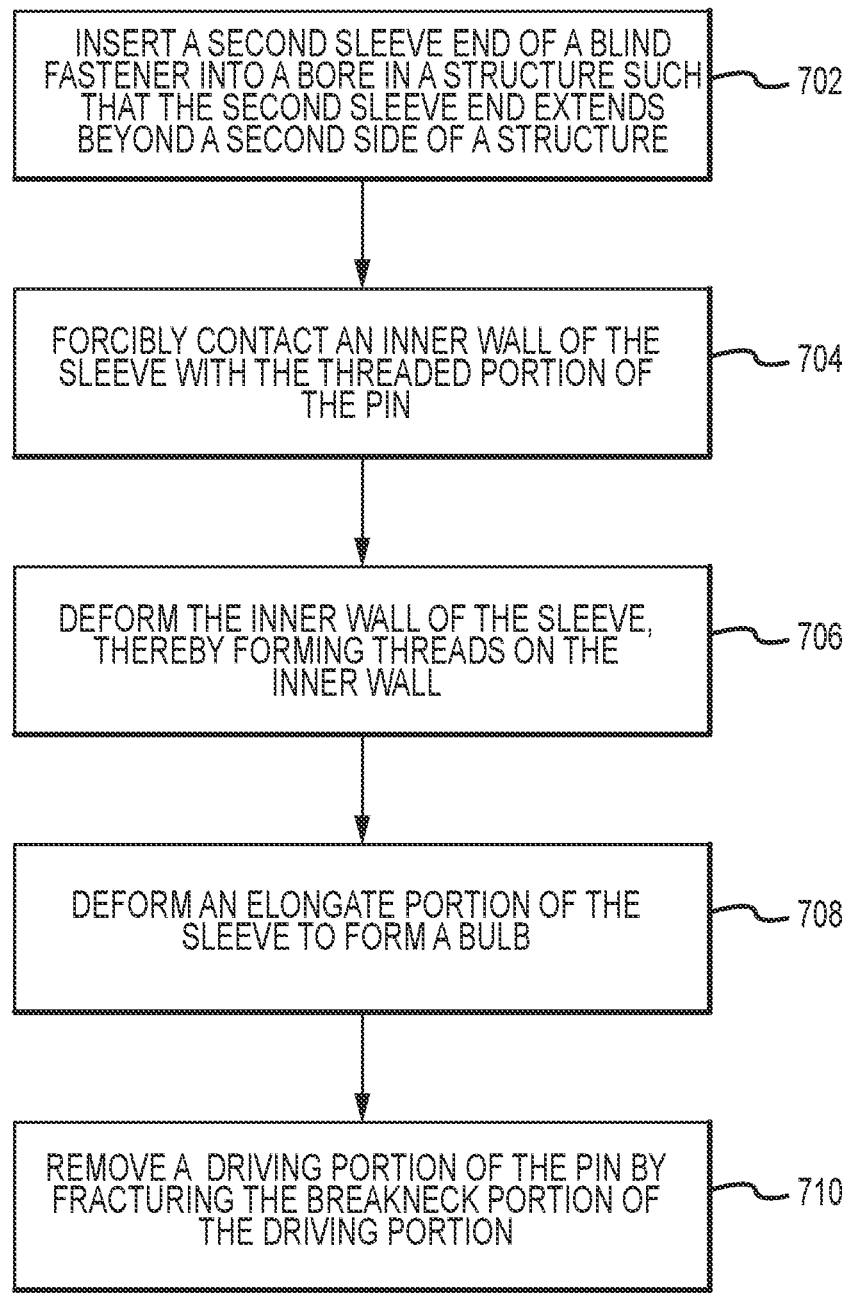
FIG. 7 is a flow chart illustrating a non-limiting embodiment of a method for fastening according to the present disclosure.

Non-limiting embodiments of blind fasteners according to the present disclosure can be used in a method for fastening a structure. FIG. 7 illustrates steps of a non-limiting embodiment of such a method. The method illustrated in FIG. 7 can comprise inserting the second sleeve end 134 of a blind fastener 100 according to the present disclosure into the bore 136 in the structure 102 such that the second sleeve end 134 of the sleeve 106 extends beyond the second side 156 of the structure 102 (at step 702). After inserting the second sleeve end 134 into the structure 102, the threaded portion 112 of the pin 104 can forcibly contact the inner wall 107 of the sleeve 106 by applying an axial force to the driving portion 116 of the pin 104 (e.g., moving the pin head portion 110 towards the first sleeve end 132) and rotating the pin 104 by applying a rotating force to the pin 104 (at step 704). The threaded portion 112 of the pin 104 can deform the inner wall 107 of the sleeve 106, thereby forming threads on the inner wall 107 (at step 706). The elongate portion 140 of the sleeve 106 can be deformed to form a bulb 125, and a substantially airtight seal can be formed between the pin 104 and the sleeve 106 and/or between the sleeve 106 and the structure 102 responsive to the threaded portion 112 forming threads on the inner wall 107 and compressing the elongate portion 140 (at step 708). In certain non-limiting embodiments, the threads on the inner wall 107 and the bulb 125 in the elongate portion 140 of the sleeve 106 can be formed simultaneously. In various non-limiting embodiments, the driving portion 116 can be removed by fracturing a breakneck portion 118 on the driving portion 116 of the pin 104 (at step 710).

Various aspects of embodiments according to the present disclosure include, but are not limited to, the aspects listed in the following numbered clauses.

Clause 1. A self-forming thread blind fastener comprising:
  a sleeve comprising
    a first sleeve end,
    a second sleeve end,
    an elongate portion extending from the first sleeve end to the second sleeve end, and
    an inner wall extending longitudinally through the sleeve from the first sleeve end to the second sleeve end and the inner wall defining a bore; and
  a pin configured to be at least partially received by the bore and comprising
    a first pin end,
    a second pin end,
    a pin head portion adjacent to the second pin end and configured to inhibit traversal of the pin head portion into the bore,
    an at least partially threaded portion, the at least partially threaded portion configured to form threads on at least a portion of the inner wall of the sleeve,
    a shank intermediate the pin head portion and the at least partially threaded region, and
    a driving portion adjacent to the first pin end and the driving portion is configured to receive a torque to rotate the pin within the sleeve and thereby axially compress and deform the sleeve and form the threads on the at least a portion of the inner wall of the sleeve.

Clause 2. The blind fastener of clause 1, wherein the at least partially threaded portion is disposed in the bore.

Clause 3. The blind fastener of clause 2, wherein the inner wall comprises a narrowed region, wherein the at least partially threaded portion is configured to form threads on at least a portion of the narrowed region.

Clause 4. The blind fastener of clause 3, wherein the narrowed region comprises a first diameter less than a major diameter of the at least partially threaded portion.

Clause 5. The blind fastener of clause 4, wherein the inner wall comprises a second region configured to receive the at least partially threaded portion, and wherein the second region is substantially tubular and comprises a second diameter greater than the major diameter of the at least partially thread portion.

Clause 6. The blind fastener of any of clauses 1-5, wherein a diameter of the bore decreases along a length of the sleeve in an axial direction towards the first sleeve end.

Clause 7. The blind fastener of any of clauses 1-6, wherein the sleeve further comprises a sleeve head portion adjacent to the first sleeve end, wherein the sleeve head portion is configured to inhibit the sleeve from passing into a bore in a structure beyond a predetermined distance.

Clause 8. The blind fastener of clause 7, wherein the sleeve head portion is configured to receive a torque.

Clause 9. The blind fastener of any of clauses 1-8, wherein the elongate portion of the sleeve is configured to deform into a bulb shape responsive to the at least partially threaded region forming threads on the inner wall and compressing the elongate portion.

Clause 10. The blind fastener of any of clauses 1-9, wherein the pin head portion is configured to compress the elongate portion responsive to the at least partially threaded region forming threads on the inner wall.

Clause 11. The blind fastener of any of clauses 1-10, wherein the driving portion comprises at least one of a substantially flat side, a rib, a spline, an indent, a knurl, a lobe, a bore, a recessed socket, threads, and a tab.

Clause 12. The blind fastener of any of clauses 1-11, wherein the pin comprises a first material with a first hardness, wherein the sleeve comprises a second material with a second hardness, and wherein the second hardness is less than the first hardness.

Clause 13. The blind fastener of any of clauses 1-12, wherein the pin comprises a breakneck portion configured to fracture upon installation of the blind fastener.

Clause 14. The blind fastener of any of clauses 1-13, wherein the driving portion is substantially cylindrical and does not comprise a breakneck portion.

Clause 15. The blind fastener of any of clauses 1-14, further comprising a locking component attached to the sleeve head portion, the driving portion, or a combination thereof, wherein the locking component is configured to inhibit the sleeve head portion from rotating during installation of the fastener.

Clause 16. The blind fastener of clause 15, wherein the locking component comprises at least one of a substantially flat side, a rib, a spline, an indent, a knurl, a lobe, a bore, a recessed socket, and a tab.

Clause 17. The blind fastener of any of clauses 1-16, wherein the blind fastener is configured to be installed in a bore in a structure configured as at least one of an aerospace part or component, an automotive part or component, a transportation part or component, and a building and construction part or component.

Clause 18. A method for fastening, the method comprising:
    inserting a second sleeve end of a sleeve of a self-forming thread blind fastener into a bore in a structure, the blind fastener comprising:
        the sleeve comprising
            a first sleeve end,
            the second sleeve end,
            an elongate portion extending from the first sleeve end to the second sleeve end, and
            an inner wall extending longitudinally through the sleeve from the first sleeve end to the second sleeve end and the inner wall defining a bore; and
        a pin configured to be at least partially received by the bore and comprising
            a first pin end,
            a second pin end,
            a pin head portion adjacent to the second pin end and configured to inhibit the pin head portion from passing into the bore,
            an at least partially threaded portion,
            a shank intermediate the pin head portion and the at least partially threaded region, and
            a driving portion adjacent to the first pin end;
    forcibly contacting the at least partially threaded portion of the pin with the inner wall of the sleeve, thereby deforming the inner wall and forming threads thereon; and
    deforming the elongate portion of the sleeve to form a bulb thereon.

Clause 19. The method of clause 18, wherein forcibly contacting comprises rotating the pin and moving the pin head portion axially towards the first sleeve end.

Clause 20. The method of any of clauses 18-19, wherein the driving portion further comprises a breakneck portion and the method further comprises rotating the pin until the pin fractures at the breakneck portion.

Clause 21. A method for fastening, the method comprising:
    inserting the second sleeve end of the sleeve of the blind fastener of any of clauses 1-17 into a bore in a structure;
    forcibly contacting the at least partially threaded portion of the pin with the inner wall of the sleeve, thereby deforming the inner wall and forming threads thereon; and deforming the elongate portion of the sleeve to form a bulb thereon.

Clause 22. A structure configured as at least one of an aerospace part or component, an automotive part or component, a transportation part or component, and a building and construction part or component, wherein the structure comprises the blind fastener according to any of clauses 1-17.

One skilled in the art will recognize that the herein described fasteners, fastening systems, structures, methods, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A self-forming thread blind fastener comprising:
    a sleeve comprising
        a first sleeve end,
        a second sleeve end,
        an elongate portion extending from the first sleeve end to the second sleeve end, and
        an inner wall extending longitudinally through the sleeve from the first sleeve end to the second sleeve end and the inner wall defining a bore; and
    a pin configured to be at least partially received by the bore and comprising
        a first pin end,
        a second pin end, a pin head portion adjacent to the second pin end and configured to inhibit traversal of the pin head portion into the bore, an at least partially threaded portion, the at least partially threaded portion configured to form threads on at least a portion of the inner wall of the sleeve, a shank intermediate the pin head portion and the at least partially threaded portion, and a driving portion adjacent to the first pin end, wherein the driving portion is configured to receive a torque to rotate the pin within the sleeve and thereby axially compress and deform the sleeve and form the threads on the at least a portion of the inner wall of the sleeve.

2. The blind fastener of claim 1, wherein the at least partially threaded portion is disposed in the bore.

3. The blind fastener of claim 2, wherein the inner wall comprises a narrowed region, wherein the at least partially threaded portion is configured to form threads on at least a portion of the narrowed region.

4. The blind fastener of claim 3, wherein the narrowed region comprises a first diameter less than a major diameter of the at least partially threaded portion.

5. The blind fastener of claim 4, wherein the inner wall comprises a second region configured to receive the at least partially threaded portion and wherein the second region is substantially tubular and comprises a second diameter greater than the major diameter of the at least partially thread portion.

6. The blind fastener of claim 1, wherein a diameter of the bore decreases along a length of the sleeve in an axial direction towards the first sleeve end.

7. The blind fastener of claim 1, wherein the sleeve further comprises a sleeve head portion adjacent to the first sleeve end, wherein the sleeve head portion is configured to inhibit the sleeve from passing into a bore in a structure beyond a predetermined distance.

8. The blind fastener of claim 7, wherein the sleeve head portion is configured to receive a torque.

9. The blind fastener of claim 1, wherein the elongate portion of the sleeve is configured to deform into a bulb shape responsive to the at least partially threaded region portion forming threads on the inner wall and compressing the elongate portion.

10. The blind fastener of claim 1, wherein the pin head portion is configured to compress the elongate portion responsive to the at least partially threaded region portion forming threads on the inner wall.

11. The blind fastener of claim 1, wherein the driving portion comprises at least one of a substantially flat side, a rib, a spline, an indent, a knurl, a lobe, a bore, a recessed socket, threads, and a tab.

12. The blind fastener of claim 1, wherein the pin comprises a first material with a first hardness, wherein the sleeve comprises a second material with a second hardness, and wherein the second hardness is less than the first hardness.

13. The blind fastener of claim 1, wherein the pin comprises a breakneck portion configured to fracture upon installation of the blind fastener.

14. The blind fastener of claim 1, wherein the driving portion is substantially cylindrical and does not comprise a breakneck portion.

15. The blind fastener of claim 1, further comprising a locking component attached to the sleeve head portion, the driving portion, or a combination thereof, wherein the locking component is configured to inhibit the sleeve head portion from rotating during installation of the fastener.

16. The blind fastener of claim 15, wherein the locking component comprises at least one of a substantially flat side, a rib, a spline, an indent, a knurl, a lobe, a bore, a recessed socket, and a tab.

17. The blind fastener of claim 1, wherein the blind fastener is configured to be installed in a bore in a structure configured as at least one of an aerospace part or component, an automotive part or component, a transportation part or component, and a building and construction part or component.

18. A method for fastening, the method comprising:
inserting a second sleeve end of a sleeve of a self-forming thread blind fastener into a bore in a structure, the blind fastener comprising:
the sleeve comprising
a first sleeve end,
the second sleeve end,
an elongate portion extending from the first sleeve end to the second sleeve end, and
an inner wall extending longitudinally through the sleeve from the first sleeve end to the second sleeve end and the inner wall defining a bore; and
a pin configured to be at least partially received by the bore and comprising
a first pin end,
a second pin end,
a pin head portion adjacent to the second pin end and configured to inhibit the pin head portion from passing into the bore,
an at least partially threaded portion,
a shank intermediate the pin head portion and the at least partially threaded portion, and
a driving portion adjacent to the first pin end;
forcibly contacting the at least partially threaded portion of the pin with the inner wall of the sleeve, thereby deforming the inner wall and forming threads thereon; and
deforming the elongate portion of the sleeve to form a bulb thereon.

19. The method of claim 18, wherein forcibly contacting comprises rotating the pin and moving the pin head portion axially towards the first sleeve end.

20. The method of claim 18, wherein the pin further comprises a breakneck portion and the method further comprises rotating the pin until the pin fractures at the breakneck portion.

* * * * *